United States Patent [19]

Curran et al.

[11] 4,403,794
[45] Sep. 13, 1983

[54] SAFETY SHIELD FOR FLANGED PIPE COUPLINGS

[75] Inventors: Donald G. Curran, Norwood, Pa.; Robert A. Anderson, Sewell, N.J.

[73] Assignee: Bunnell Plastics, Incorporated, Mickelton, N.J.

[21] Appl. No.: 229,083

[22] Filed: Jan. 28, 1981

[51] Int. Cl.$^3$ .............................................. F16L 47/00
[52] U.S. Cl. ................................ 285/45; 174/DIG. 8; 285/93; 285/381; 285/419; 285/DIG. 22
[58] Field of Search .................... 285/45, 93, 381, 419, 285/DIG. 22; 174/DIG. 8

[56] References Cited

U.S. PATENT DOCUMENTS

| | | | |
|---|---|---|---|
| 2,585,438 | 2/1952 | Clingman | 285/DIG. 22 X |
| 2,699,960 | 1/1955 | Callery et al. | 285/93 X |
| 2,708,123 | 2/1955 | Risley et al. | 285/45 X |
| 2,772,034 | 11/1956 | Richmond, Jr. | 285/DIG. 22 X |
| 3,113,790 | 12/1963 | Matthiessen | 285/419 X |
| 3,265,092 | 8/1966 | Ely, Jr. et al. | 428/421 X |
| 3,379,218 | 4/1968 | Conde | 285/381 X |
| 3,387,364 | 6/1968 | Boggs | 174/DIG. 8 X |
| 3,526,683 | 9/1970 | Heslop et al. | 174/DIG. 8 X |
| 3,565,116 | 2/1971 | Gabin | 285/45 |
| 3,567,259 | 3/1971 | Benson et al. | 285/381 |
| 3,850,451 | 11/1974 | Matthiessen | 285/13 |
| 4,141,576 | 2/1979 | Lupke et al. | 285/381 X |
| 4,216,980 | 12/1980 | Shreve | 285/13 |

FOREIGN PATENT DOCUMENTS 2145831  3/1973  Fed. Rep. of Germany ...... 285/381

OTHER PUBLICATIONS

Advertising Literature of Slickbar, Inc., Southport, Conn. entitled "Milsheff Spray-Stop Valve and Flange Covers" (copyright 1975).
Advertising Brochure of Ramco Manufacturing Company, Roselle Park, N.J. entitled "The Safety Shield Story" (1979).

Primary Examiner—Thomas F. Callaghan
Attorney, Agent, or Firm—Howson and Howson

[57] ABSTRACT

A safety shield for containing and deflecting a fluid leaking from a flanged pipe coupling in the form of an arcuate strip of transparent fluoropolymer. The strip has a flange along each circumferential edge which is integral with the strip and extends radially inwardly thereof. The strip is of sufficient length to encase the circumference of the pipe coupling flange to which it is applied with the opposing ends overlapping and fastened together. The flanges closely engage the radial surfaces of the coupling flanges. The safety shield is obtained by heat-shrinking a heat-shrinkable tube of fluoropolymer while restricting radial shrinkage thereof except the marginal edge portions which become the flanges.

12 Claims, 4 Drawing Figures

SAFETY SHIELD FOR FLANGED PIPE COUPLINGS

BACKGROUND OF THE INVENTION

For many years it has been common practice to join pipe sections together by providing the sections with an annular flange at each end and bolting the sections together by means of such flanges. Many pipelines so constructed are intended to carry high-pressure steam or corrosive or toxic chemicals under pressure. Experience has shown that on occasion high-pressure flange leaks occur in such pipe lines, resulting in injury to personnel and damage to equipment.

Various types of safety shields have been designed for the purpose of preventing personal injury and damage to equipment caused by such flange leaks. Generally they have comprised a strip of metal or a fabric impregnated with a polymer, the strip having a flange, which in the case of metal is generally segmented, along each longitudinal edge. The shields are wrapped about the pipe flanges with the opposing ends overlapping. Some shields are secured in place by means of screws which hold the overlapping ends together. Others are secured by means of draw strings.

For the most part, such shields have been opaque, so that the presence of a flange leak is not observed until the fluid seeps out of the shield and drips to the floor or other surface below. Depending upon the material from which the shield is composed, it may be destroyed by leakage of corrosive liquids.

More recently (see U.S. Pat. No. 4,216,980), there has been devised a safety shield comprising an elongated, flexible strip of polytetrafluoroethylene having longitudinal edge or flange portions which are segmented and overlap when the shield is wrapped around a pipe flange. A lace is passed through each of the several segments and tied in order to secure the shield to the pipe flange. Such shield has of number of disadvantages. It is difficult and expensive to fabricate, and its application to a pipe flange is tedious and time-consuming. Also, the removal and reapplication thereof in order to repair a leak is a slow and costly operation.

A primary object of this invention is to provide a novel safety shield for pipe coupling flanges which is of simple construction and may be applied to and removed from a pipe coupling flange by means of a simple snap on-snap off procedure.

Another object of this invention is to provide a novel method for making a safety shield for a pipe flange which is inexpensive and relatively easy to carry out.

Still another object of this invention is to provide a safety shield which is transparent, thereby enabling workers to observe leaks at pipe flanges before the fluid, which may be corrosive, runs onto the surface below the flange.

Yet another object of this invention is the provision of a safety shield of corrosion-resistant material which can be removed and replaced many times during its useful life.

A still further object of this invention is a novel safety shield which, after installation, can be heat shrunk in place to obtain a tight fit about the pipe flange.

These and other objects of this invention will become further apparent from the accompanying drawings and description of preferred embodiments.

DESCRIPTION OF THE DRAWINGS

The present invention is described in greater detail in conjunction with the accompanying drawings in which.

DESCRIPTION OF THE PREFERRED EMBODIMENTS

Figure 1:
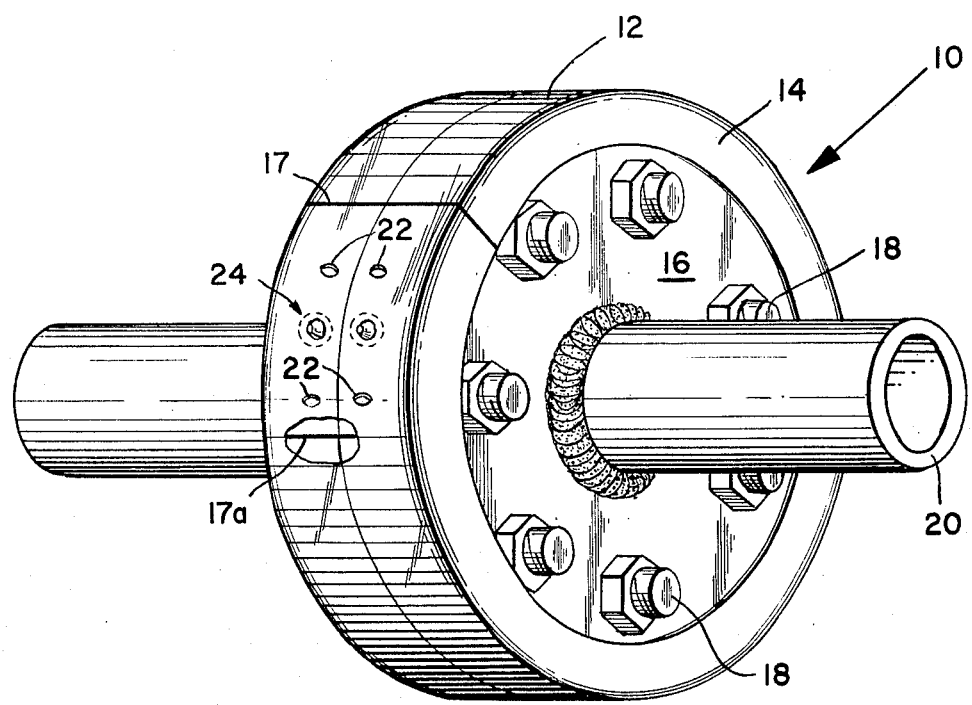
FIG. 1 is a perspective view of a safety shield according to the present invention secured to a flanged pipe coupling, with a section broken away to show the underlying end of the shield.

The safety shield 10 of this invention comprises an arcuate strip 12 of a fluoropolymer having flanges 14 integral with and extending along each longitudinal edge, only one such flange being visible in FIG. 1. The strip 12 has a length such as to enable it to completely surround the pipe flanges 16, again only one such pipe flange being seen in FIG. 1. Pipe flanges 16 are connected by a plurality of bolt and nut means 18. The strip 12 not only completely surrounds the pipe flanges 16, but is of sufficient length to enable the opposing ends thereof to overlap and be connected together by fastening means described in greater detail hereinbelow. This overlap is illustrated in FIG. 1, in which end 17 with its flanges 14 is shown overlying end 17a and its flanges 14.

The width of the strip 12 is sufficient to extend completely across the pipe flanges 16 in a direction axially of the flanges, thereby permitting the flanges 14 of the shield 10, which flanges are integral with the strip 12, to extend radially inward toward the pipe 20. The width of the flanges 14 measured in a radial direction can vary considerably, but, as illustrated in FIG. 1, advantageously may be merely sufficient to prevent fluid under pressure, which may escape between the pipe flanges 16, from spraying outwardly and striking workers and equipment adjacent the pipe joint. In addition, by so limiting the radial width of the flanges, the bolt and nut means 18 for coupling the pipe flanges together are readily accessible to workmen to enable them to tighten the connections between the pipe flanges 16 and thereby prevent further leakage of fluid which may be corrosive.

The safety shield of this invention can be so designed as to be usable with flanged pipe joints of varying diameter by providing a plurality of circumferentially spaced means for connecting the overlapping ends of the arcuate strip 12 together. Preferably, the width of the strip 12 is such that the inwardly directed edge flanges 14 closely engage the radial surfaces of the pipe flanges 16 in order to minimize the possibility of fluid under pressure escaping between the pipe flanges 16 and from spraying out from the safety shield.

Figure 2:
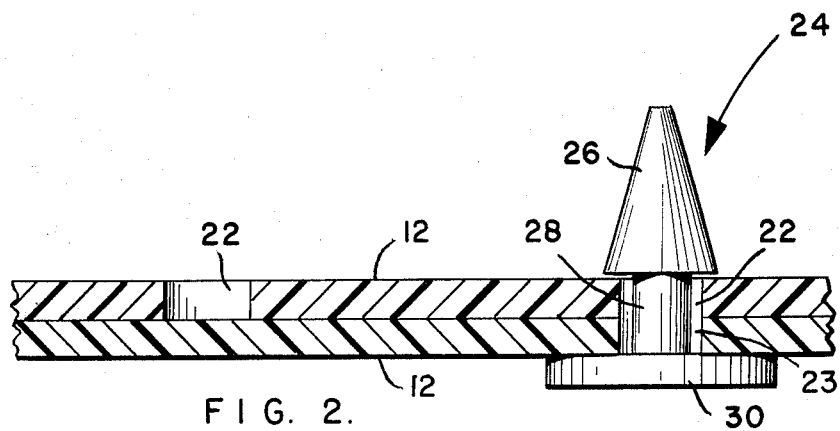
FIG. 2 is an enlarged cross-sectional view of means for coupling together the ends of the safety shield of the invention.

Referring specifically to FIGS. 1 and 2, the means for fastening together the overlapping ends of the strip 12 preferably comprises a series of circumferentially spaced pairs of holes 22 in one end of the strip 12 and a pair of studs 24 in the other end of the strip, which studs engage the holes 22. The studs preferably have a head portion 26, a neck portion 28, and a collar 30. The head portion of the stud preferably increases in diameter from its end to a maximum adjacent the neck portion, e.g. is conical in configuration. The maximum diameter of the head portion preferably is somewhat greater than the diameter of the holes 22, the diameter of the neck portion 28 of the studs being slightly smaller than the diameter of the holes 22, whereby a snap fit is obtained between the studs 24 and holes 22. The studs 22 can be attached to one end of the strip 12 by being inserted in a hole 23 similar to hole 22, the stud being maintained in place by means of the head portion 26 and collar 30. The snap on-snap off feature of the safety shield of the present invention is of considerable importance in simplifying maintenance of flanged pipe joints. In addition, the fluoropolymer of which the shield is made is transparent, making possible visual inspection of pipe joints for leaks.

Although not shown in the drawings, the shield 10 may have a hole in the arcuate strip portion 12 for receiving a valve stem where the pipe joint to be protected also includes a valve, such as a valve of the ball, butterfly, plug or diaphragm type.

A particularly advantageous feature of the novel safety shields of this invention is their ability to be further heat-shrunk after installation. Since in making the shields by the method described hereinafter the strip 12, except for the flange portions 14, is prevented from shrinking, the strip has residual heat-shrinkage properties. Thus, when the shield is installed on a hot pipe joint, further shrinkage of the strip 12 takes place to provide a very snug fit. If the pipe joint is relatively cool, similar shrinkage can be obtained by directing a stream of hot air against the shield after installation.

Figure 3:
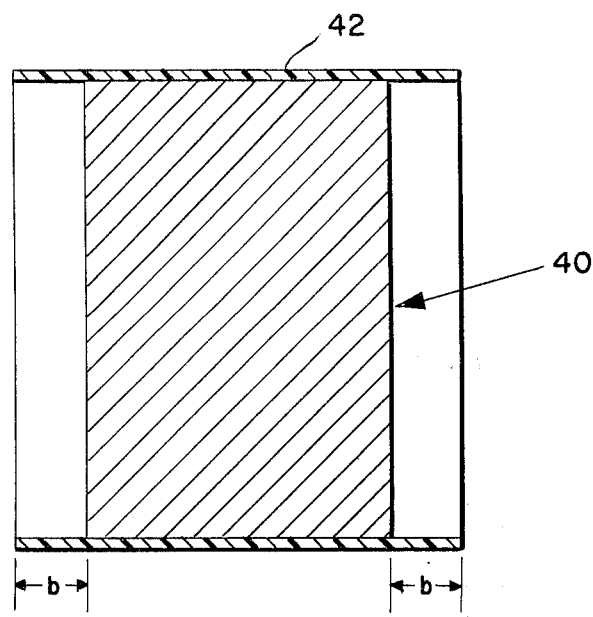
FIG. 3 is a diagrammatic axial section showing an annular section of a heat-shrinkable tubing on a mandrel ready for heat shrinking to obtain the flanges for the safety shield of this invention.
Figure 4:
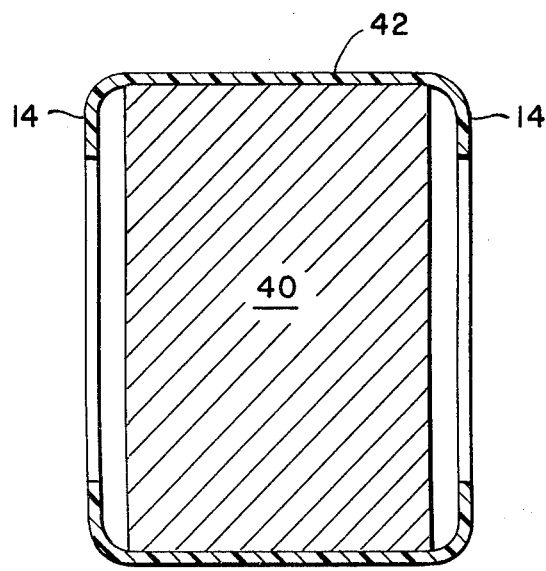
FIG. 4 is a diagrammatic axial section illustrating an annular section of tubing heat-shrunk to provide a flanged safety shield according to this invention.

Turning now to FIGS. 3 and 4, there is shown a mandrel 40, of a suitable metal, such as steel, about which has been placed an annular section of a heat shrinkable tube 42 of a fluoropolymer. The respective diameters of the mandrel 40 and tube 42 should be such that there is a relatively snug fit between the two. As shown in FIG. 3, the tube section 42 is of such length as to extend a distance "b" beyond each circumferential edge of the mandrel 40. Upon heating the section 42 of heat-shrinkable tubing to elevated temperatures, the section attempts to shrink to that diameter it had been prior to being expanded. However, such shrinkage is prevented by the mandrel 40 except in the portions "b" which are free to shrink, and in shrinking become flanges 14 of the safety shield (see FIGS. 1 and 4).

Following the above described heat treatment for providing the flanges 14, after cooling, the tube section 42 is removed from the mandrel by cutting it longitudinally. Upon removal from the mandrel the tube section retains its arcuate shape. The safety shield 10 is then obtained by providing the thus formed tube section with means, such as described above, for fastening the opposing ends thereof together.

As stated previously, the safety shield of this invention is formed by heat-shrinking a heat-shrinkable transparent fluoropolymer. Fluoropolymers and the treatment thereof so as to have these properties are described in U.S. Pat. No. 3,265,092 (U.S. Pat. No. Re. 27,028), the disclosure of which patent is incorporated herein by reference.

More particularly, according to U.S. Pat. No. 3,265,092, heat-shrinkable tubing which may be used in making the safety shields of the present invention is obtained by melt extruding, at reduced temperatures and extrusion rates, a copolymer of tetrafluoroethylene and hexafluoropropylene. Such copolymers generally will comprise about 5 to 35% by weight of hexafluoropropylene and are commonly referred to as FEP-fluorocarbon. A particularly preferred copolymer contains about 15% of hexafluoropropylene.

The tubing so extruded is expanded at temperatures between 250° and 400° F. followed by cooling while in an expanded condition. Expansion can be effected by introducing to the heated tube a fluid under pressure, such as air, nitrogen, etc. Upon heating the expanded tubing to temperatures between 200° and 400° F., the tubing contracts. Depending upon the expansion and contraction conditions employed, the ratio of expanded diameter to contracted diameter will be from about 1.21:1 to 2.0:1. Ordinarily the tubing will have a wall thickness in the range of about 0.005 to 0.06 inches.

In carrying out the method of this invention, the heat-shrinking step corresponds to that described in U.S. Pat. No. 3,265,092.

Rather than expanding the fluoropolymer tubing by the above-described method, such expansion can be accomplished mechanically under ambient conditions. Upon heating, the mechanically expanded tubing will quickly shrink to the desired shape. Such mechanical expansion can be accomplished by providing one end of the mandrel 40 with a conical configuration, and forcing the tube over the tapered end to expand it onto the mandrel, after which the tubing is heat-shrunk as previously described.

Fluorocarbon polymers usable in the safety shields of this invention comprise the melt-fabricable perhalopolyfluoroethylene copolymers. These copolymers include chlorotrifluoroethylene and tetrafluoroethylene (TFE) copolymerized with fluoroolefins such as hexafluoropropylene, or with perfluoroalkyl vinyl ether monomers such as perfluoropropyl- or ethyl-vinyl ether, or with nonfluorinated monomers such as alkylenes, e.g. ethylene, including the tetrafluoroethylene/ethylene binary polymers and terpolymers.

What is claimed is:

1. A safety shield for containing and deflecting a fluid leaking from a flanged pipe coupling comprising an elongated heat-shrinkable arcuate strip of transparent fluoropolymer, a flange along each longitudinal edge of said strip extending radially inward thereof, said flanges having been obtained by subjecting an annular section of heat-shrinkable tubing formed of said fluoropolymer to shrinking conditions while substantially restricting radial shrinkage thereof except along marginal edge portions of said section, said strip having a length sufficient to enable it to be wrapped around the circumference of the pipe coupling flanges to which it is applied, whereby one end of said strip overlaps the opposing end of said strip, and a width such that said flanges extend radially inward toward said pipe adjacent said pipe flanges, and means for coupling together the overlapping ends of said strip.

2. A safety shield according to claim 1 in which said means for coupling together the overlapping ends of said strip comprises at least one hole in said strip adjacent one end thereof, and a stud for engaging said hole in interlocking relation attached to said strip adjacent the other end thereof.

3. A safety shield according to claim 2 in which said stud has a head portion and a neck portion of lesser diameter than said head portion, the diameter of said head portion being greater than the diameter of said hole it is intended to engage in interlocking relation.

4. A safety shield according to claim 3 in which the head of said stud tapers radially outward from the end thereof to a point of maximum diameter adjacent said neck portion.

5. A safety shield according to claim 1 in which said heat-shrinkable tubing from which said shield is formed comprises a copolymer of tetrafluoroethylene and 5 to 35% by weight of hexafluoropropylene, said tubing having a ratio of expanded diameter to recovered diameter of from 1.21 to 2.0.

6. A safety shield according to claim 5 in which said tubing has a wall thickness between about 0.005 and 0.06 inches.

7. A shielded pipe joint comprising in combination a pipe joint formed of opposing annular flanges which extend radially from the pipe sections to which they are connected and means for coupling said flanges together, and a safety shield for containing and deflecting fluid which may leak from said pipe coupling comprising an elongated arcuate strip of transparent fluoropolymer, a flange along each longitudinal edge of said strip extending radially inward thereof, said flanges having been obtained by subjecting an annular section of heat-shrinkable tubing formed of said fluoropolymer to shrinking conditions while substantially restricting radial shrinkage thereof except along marginal edge portions of said section, said strip having a length sufficient to enable it to wrap around the circumference of said pipe coupling flanges with one end of said strip overlapping the opposing end of said strip, and a width such that said flanges extend radially inward toward said pipe sections adjacent said pipe flanges, the overlapping ends of said strip being coupled together by fastening means, said strip having been heat shrunk after application of said shield to said pipe coupling flanges.

8. A shielded pipe joint according to claim 7 in which said means for coupling together the overlapping ends of said strip comprises at least one hole in said strip adjacent one end thereof, and a stud for engaging said hole in interlocking relation attached to said strip adjacent the other end thereof.

9. A shielded pipe joint according to claim 8 in which said stud has a head portion and a neck portion of lesser diameter than said head portion, the diameter of said head portion being greater than the diameter of said hole it is intended to engage in interlocking relation.

10. A shielded pipe joint according to claim 9 in which the head of said stud tapers radially outward from the end thereof to a point of maximum diameter adjacent said neck portion.

11. A shielded pipe joint according to claim 7 in which said heat-shrinkable tubing from which said shield is formed comprises a copolymer of tetrafluoroethylene and 5 to 35% by weight of hexafluoropropylene, said tubing having a ratio of expanded diameter to recovered diameter of from 1.21 to 2.0.

12. A shielded pipe joint according to claim 11 in which said tubing has a wall thickness between about 0.005 and 0.06 inches.

* * * * *